United States Patent [19]
Ryan

[11] 3,708,019
[45] Jan. 2, 1973

[54] SPLIT-LIFT CULTIVATOR
[75] Inventor: Edward Clyde Ryan, Ankeny, Iowa
[73] Assignee: Deere & Company, Moline, Ill.
[22] Filed: Nov. 2, 1970
[21] Appl. No.: 85,997

[52] U.S. Cl. ............172/470, 172/484, 172/497, 172/705
[51] Int. Cl. ...........................A01b 63/10
[58] Field of Search......172/448, 484, 491, 739, 740, 172/462, 499, 506, 488, 264, 265, 705, 706, 621, 470

[56] References Cited

UNITED STATES PATENTS

| | | | |
|---|---|---|---|
| 2,358,531 | 9/1944 | Orendorff | 172/264 X |
| 3,490,542 | 1/1970 | Eiten | 172/739 X |
| 3,100,018 | 8/1963 | Sokolowski | 172/705 X |
| 2,254,414 | 9/1941 | Bowlin | 172/705 X |
| 2,752,837 | 7/1956 | Parker | 172/705 X |
| 1,932,112 | 10/1933 | Lindgren | 172/462 |
| 2,593,176 | 4/1952 | Patterson | 172/739 X |
| 3,133,599 | 5/1964 | Mayfield et al. | 172/488 X |
| 2,784,656 | 3/1957 | Sheppard | 172/448 X |

Primary Examiner—Robert E. Pulfrey
Assistant Examiner—R. T. Rader
Attorney—H. Vincent Harsha, Harold M. Knoth, William A. Murray, John M. Nolan and Raymond L. Hollister

[57] ABSTRACT

A row crop cultivator including an elongated toolbar adapted for attachment to a tractor three-point hitch and a plurality of cultivator rigs pivotally connected to the toolbar in spaced locations by upper and lower links. A pair of lift bars are pivotally mounted on the toolbar and extend beneath the upper links for the cultivator rigs and a pair of hydraulic cylinders are operatively connected between the toolbar and lift bars to individually or simultaneously move the lift bars about the pivotal connections with the toolbar. When the lift bars are pivoted upwardly, they engage the upper links and raise the cultivator rigs independently of any movement of the toolbar. Coil springs are tensioned between the upper links and the lift bars so that when the lift bars are pivoted downwardly, the springs are tensioned to provide a downward bias on the rigs.

7 Claims, 3 Drawing Figures

INVENTOR.
EDWARD C. RYAN

BY
R L Hollister
ATTORNEY

SPLIT-LIFT CULTIVATOR

BACKGROUND OF THE INVENTION

The present invention relates generally to cultivators, and more particularly relates to improvements in row crop cultivators.

It has become common practice to employ rear-mounted cultivators which include an elongated toolbar adapted for connection to the conventional tractor three-point hitch and in which the cultivator rigs are mounted to the rear of the toolbar by four-bar linkages so that when the toolbar is raised, the cultivator rigs are also raised and, when the toolbar is lowered, the cultivator rigs are lowered to a working position and are permitted to float with respect to the toolbar. Many of these rear-mounted cultivators are designed to work four or more crop rows at a time.

With modern farming practices, it has become quite common to find grass waterways and contour strips extending across a cultivated field at an angle other than 90° to the crop rows and it is difficult to completely cultivate the crop rows up to the edge of the grass waterways or contour strips with a wide cultivator. Therefore, it is desirable to be able to selectively raise either the right or left side of a wide cultivator independently of the other.

In cultivators of the type described above, the cultivator rigs are free to float or move vertically with respect to the toolbar when lowered because of the four-bar linkage connection with the toolbar. Because of this floating action, the tools mounted on the rigs may not operate at the desired depth in hard ground. Therefore, it is also desirable to provide a downward bias on the cultivator rigs to yieldably hold the tools in the ground.

SUMMARY OF THE INVENTION

The principal object of the present invention is to provide a split-lift system for earth-working tools pivotally mounted on a toolbar so that a portion of the tools can be raised or lowered independently of the others.

A more specific object of the present invention is to provide a split-lift system for earth-working tools pivotally connected to a toolbar which permits a portion of the tools to be raised independently of the others and which provides a downward bias on the tools when the tools are lowered.

Another object of the present invention is to provide a novel arrangement for providing an adjustable down pressure on the cultivator rigs of a row crop cultivator.

According to the present invention, a pair of elongated bars are pivotally mounted to the rear of a toolbar for vertical pivotal movement and are positioned under the upper links of the four-bar linkages connecting the cultivator rigs to the toolbar so that when the elongated lift bars are pivoted upwardly, they will engage the upper links and raise the cultivator rigs. A coil spring is anchored between each of the upper links and the respective lift bars so that when the lift bars are pivoted downwardly, the coil springs are tensioned to provide a downward bias on the cultivator rigs.

The above objects and additional objects and advantages of the invention will become apparent along with the details of construction of a preferred embodiment of the invention from a reading of the following detailed description when taken in conjunction with the accompanying drawings.

DESCRIPTION OF THE PREFERRED EMBODIMENT

Figure 1:
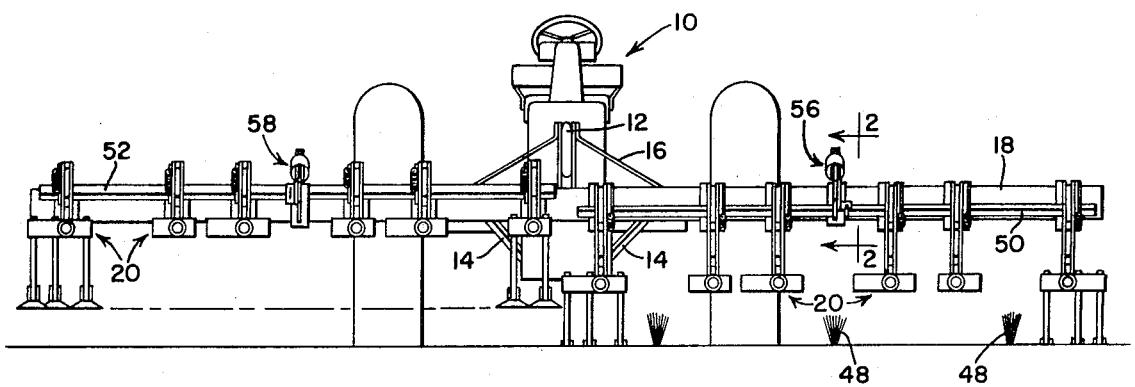
FIG. 1 is a rear elevational view of a row crop cultivator equipped with a split-lift system according to the present invention.

Referring to the drawings, the numeral 10 designates generally a typical hydraulic lift-equipped agricultural tractor as representative of a mobile frame with which the invention is useful. The tractor has the usual upper and lower draft links 12 and 14, respectively. The upper link 12 is connected with a mast 16 which is rigidly mounted on a transverse support element in the form of an elongated toolbar 18, and the lower links 14 are connected with conventional hitch pins (not illustrated) secured to the toolbar 18. A plurality of earth-working implements in the form of cultivators 20 are arranged in trailing relation to the toolbar and are laterally spaced along the toolbar. Each of the cultivators 20 has a rig pipe or carrier element 22 for mounting the plurality of cultivator shovels 24 and a gauge wheel 26.

A plurality of linkages 28 connect the cultivators to the toolbar for ground-traversing movement in unison and further provide for relative vertical movement between the toolbar and cultivators. Each of these linkages may be a typical four-bar linkage, here including upper and lower links 30 and 32 pivotally connected on transverse pivots 34, 36, 38 and 40 to a bracket 42 rigidly secured on the toolbar 18 by U-bolt 43 and to a mast 44 rigid on the rig pipe or carrier element 22. Downward movement of each of the cultivators 20 with respect to the toolbar 18 is limited by a pin 46 carried by the mast 44 for engagement with the top surface of the link 32 when the cultivator has reached its lower limit with respect to the toolbar 18.

The implement thus far described is of conventional structure and is operated in the conventional manner. To transport the implement, the toolbar 18 is raised by the hydraulically-operated draft links 12 and 14. On initial upward movement of the toolbar 18 from the position illustrated in FIG. 3, the cultivators will remain in a ground-working position. Once the relative movement between the toolbar 18 and cultivators 20 has reached the point where the stop pins 46 contact the lower links 32, the cultivators will move upwardly with the toolbar to a transport position. When the cultivator has been transported to a proper working position in a field, the toolbar 18 and cultivators 20 are lowered to the positions illustrated in FIG. 3 and are pulled forwardly by the tractor 10 to work the ground and uproot weeds between crop rows 48.

According to the present invention, the conventional rear-mounted row crop cultivator thus far described is provided with a split-lift system which permits the cultivators 20 mounted on either side of the transverse centerline of the toolbar 18 to be raised and lowered independently of the other cultivators and without requiring any movement of the toolbar. This split-lift system includes right- and left-hand adjusting elements or elongated lift bars 50 and 52, respectively. The lift bar 50 extends between the links 30 and 32 for the cultivators on the right-hand side of the transverse centerline of the toolbar and the lift bar 52 extends between the links 30 and 32 for the cultivators on the left-hand side of the transverse centerline of the toolbar 18. Since the construction, mounting and operation of each of the lift bars 50 and 52 are identical, only the lift bar 50 will be described in detail.

The lift bar 50 is supported at its opposite ends by a pair of pivot arms 54, each of which has one end mounted on the pivot 34 of one of the four-bar linkages 28. The opposite end of each of the arms 54 is provided with an opening having a configuration to slidably receive the lift bar 50. When the arms 54 are placed on the lift bar 50, they may be secured in position in any suitable manner such as welding or they may be left free to slide on the lift bar 50 since they will be maintained in the proper lateral position by the bolts forming the pivots 34. If desired, the number of pivot arms 54 can equal the number of cultivators 20 so that there will be one pivot arm mounted on each pivot 34. In the absence of a pivot arm 54 for each cultivator 20, a plurality of anchor brackets will be mounted on the lift bar 30 for a purpose to be explained hereinafter.

The right- and left-hand lift bars 50 and 52 can be moved vertically about the pivots 34 by independent or simultaneous operation of right- and left-hand power units 56 and 58. Each of the power units is mounted on the toolbar 18 by a bracket which includes a base plate 60 secured against the toolbar 18 by a U-bolt 62. An elongated anchor arm 64 has one end secured to the base plate 60 as by welding or the like and extends rearwardly of the toolbar. The anchor arm 64 is reinforced on the base plate 60 by a gusset plate 66. An actuating arm 68 is pivotally mounted near the forward end of the anchor arm 64 by a pivot bolt 70 which is in alignment with the pivots 34. The actuating arm 68 is pivotally mounted intermediate its ends, and its lower end is provided with a laterally projecting leg 72 which is apertured to receive the legs of the U-bolt 74. The lower end of arm 68 and leg 72 are provided with a recess to receive one corner of the lift bar 50, and the lift bar 50 is secured in this position by the U-bolt 74. The anchor end 76 of a double-acting extensible and retractable hydraulic cylinder 78 is secured to the rear end of the anchor arm 64 by a pivot pin 80 and the rod end 82 of the cylinder 78 is secured to the upper end of the actuating arm 68 by a pivot pin 84. Hydraulic lines 86 and 88 extend from the opposite ends of the cylinder 78 to conventional hydraulic outlets on the tractor 10 so that by manipulation of a conventional valve on the tractor 10 the operator can cause extension or retraction of the cylinder 78 at will.

Figure 2:
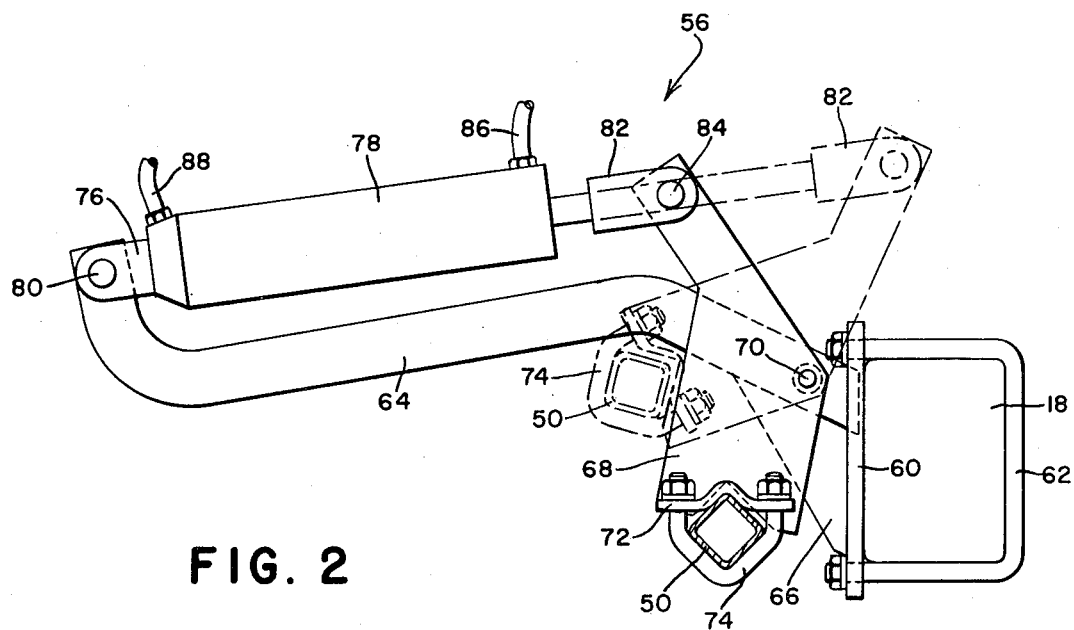
FIG. 2 is a sectional view taken substantially along the line 2—2 of FIG. 1; and, FIG. 3 is an end elevation view of a cultivator illustrated in FIG. 1 showing various positions of the cultivator.
Figure 3:
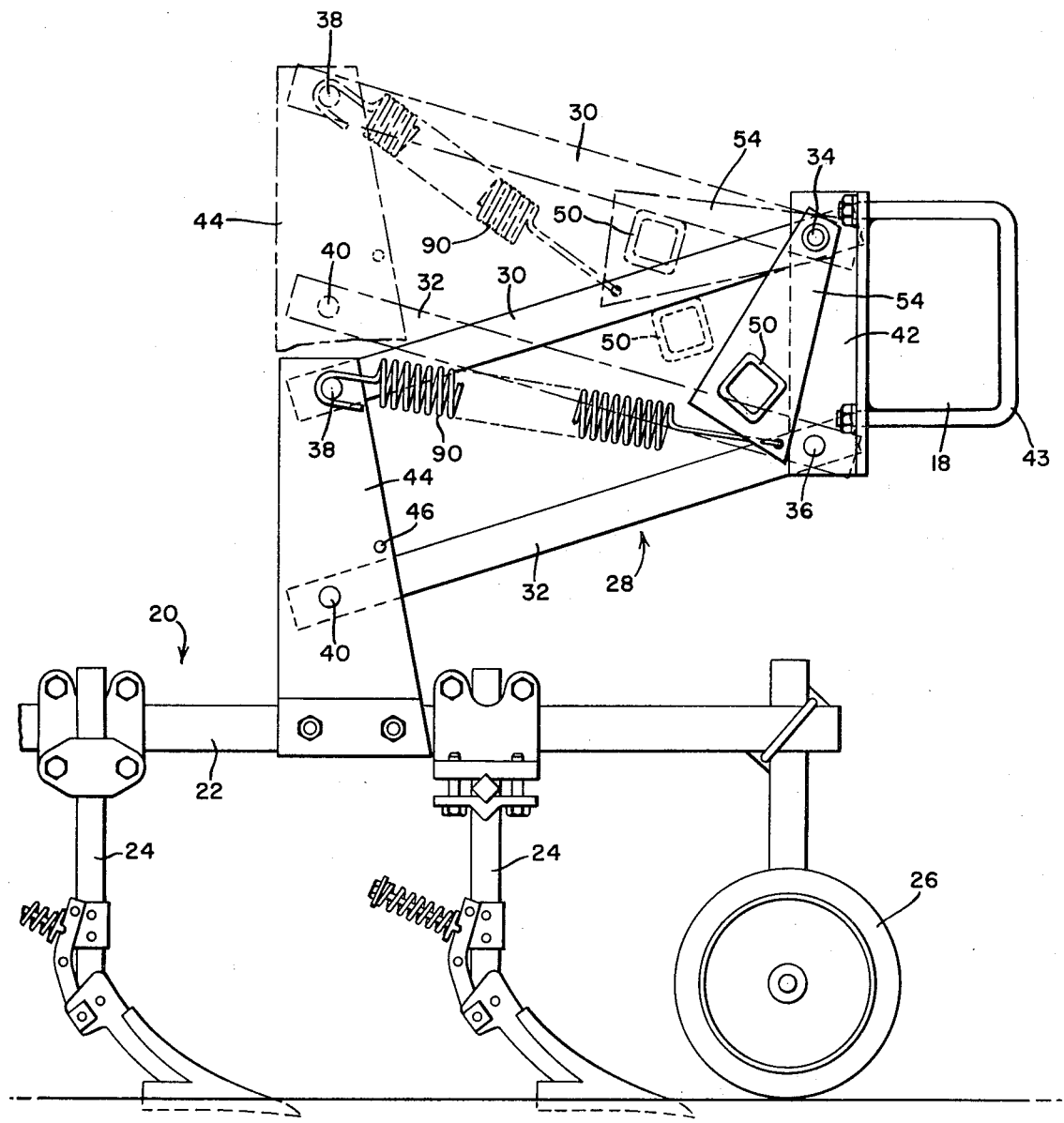

When the cylinder 78 is extended, it rocks the actuating arm 68 about the pivot 70 to move the lift bar 50 from the solid line position illustrated in FIGS. 2 and 3 to the broken line position illustrated in FIGS. 2 and 3. When the lift bar 50 reaches the position indicated by the dotted lines in FIG. 3, it contacts the upper links 30 to raise the cultivators 20 on the toolbar 18 to the position illustrated by the broken lines in FIG. 3. By extending only one of the power units 56 and 58, the cultivators on one end of the toolbar 18 can be raised without raising the cultivators on the opposite end of the toolbar so that the implement can more effectively work point rows when approaching waterways or contour strips.

The split-lift system can also be employed to achieve greater transport clearance. For example, when a toolbar 18 is raised for transport, the cultivators 20 will assume the lowest position permitted by the stop pins 46 and will be positioned a relatively great distance below the toolbar 18. However, by extending the cylinders 78 of the power units 56 and 58, the cultivators 20 will be raised on the toolbar to provide a greater clearance between the shovels 24 and the ground.

The split-lift system according to the present invention is also utilized to provide a downward pressure on the cultivators to help maintain the shovels 24 in the ground. This is accomplished by tensioning a plurality of coil springs 90 between the upper links 30 and the lift bars 50 and 52. The upper end of each spring 90 is anchored to the pivot 38 interconnecting the upper link 30 with the mast 44 and the lower end of each spring is anchored to one of the pivot arms 54. In the case where only a pair of pivot arms 54 are used for each lift bar, the lower ends of the springs 90 for the cultivators between the extreme end cultivators for each section of the implement would be secured by anchor brackets (not illustrated) mounted on the lift bars.

The function of the coil springs 90 can best be understood by referring to FIGS. 2 and 3 where it can be seen that as the cylinder 78 is retracted to pivot the lift bar downwardly, the cultivators move downwardly until stopped by contact between the wheels 26 and the ground. At this time, the lift bar will be in an intermediate position illustrated by dotted lines in FIG. 3. Additional retraction of the cylinder 78 will continue to move the lift bars downwardly and slightly forwardly to tension the springs 90. Since the ends of the springs 90 anchored to the lift bars are positioned below the ends anchored to the pivot pins 38, a component of the spring force acting on the pivots 38 will be downwardly to provide a downward bias on the cultivators.

From the foregoing description, it can be seen that the present invention provides an extremely simple split-lift system for row crop cultivators which also provides a convenient method to provide a downward bias on the cultivators.

Having thus described a single preferred embodiment of the invention, various modifications within the spirit and scope of the invention will become obvious to those skilled in the art and can be made without departing from the underlying principles of the invention.

I claim:

1. An agricultural implement including a support element adapted to be carried by a mobile frame, an earth-working tool carrier element, and a pair of upper and lower substantially parallel link means pivotally connected to the support element and the carrier element to interconnect the two elements for ground-traversal in unison and enable vertical movement of the carrier element relative to the support element, characterized in that an adjusting element is positioned directly beneath one of the link means and pivotally connected to the support element for vertical swinging movement, power means is operatively connected to and acts between the support element and adjusting element to vertically move the adjusting element relative to the support element, and a resilient element is anchored between the one of the link means and the adjusting element so that, upon lowering movement of the adjusting element relative to the support element, the adjusting element will move away from the one of the link means and tension the resilient element to provide a downward bias on the pair of link means and carrier element, and upon raising movement of the adjusting element relative to support element, the adjusting element will contact the one of the link means and raise the pair of link means and connected carrier element relative to the support element.

2. An implement as defined in claim 1 wherein the adjusting element is positioned beneath the upper of the pair of link means and the resilient element is a coil spring having one end anchored at the pivotal connection between the upper of the pair of link means and the carrier element and its other end anchored to the adjusting element.

3. An agricultural implement including an elongated support element extending transversely to the normal direction of movement of the implement and adapted to be carried by a mobile frame for raising and lowering movement, a plurality of earth-working tool carrier elements positioned rearwardly of the support element in spaced positions, and a plurality of pairs of upper and lower substantially parallel link means pivotally connected to the support element and carrier elements to interconnect the carrier elements with the support element for ground-traversal in unison and enable vertical movement of the carrier elements relative to the support element, there being a pair of link means for each carrier element characterized in that a first adjusting element is positioned directly between the links of a plurality of the pairs of link means and pivotally connected to the support element for vertical swinging movement, a second adjusting element is positioned directly between the links of a plurality of other pairs of link means and pivotally connected to the support element for vertical swinging movement, each of the adjusting elements includes an elongated bar extending parallel to the support element and positioned between the upper and lower link means of its respective pairs of link means, at least two pivot arms are secured to the bar and pivotally connected to the support element, one of the pivot arms for each bar is pivotally connected intermediate its ends to the support element and has one end connected to the bar, first and second power means are operatively connected to and act between the support element and the one pivot arm of the first and second adjusting elements, respectively, to move the adjusting elements relative to the support element, and each of the power means includes a hydraulic cylinder having one end connected to the end of the one arm remote from the bar and its other end operatively connected to the support element, the parts being so constructed and arranged so that upon raising movement of either one or both of the adjusting elements relative to the support element, the adjusting elements will contact the upper links of their respective pairs of link means and raise their respective pairs of link means and connected carrier elements relative to the support element.

4. The implement set forth in claim 3 wherein a resilient element is connected between each of the upper link means and their associated bar to provide a downward bias on the link means and connected carrier elements when the bars are pivoted downwardly and moved from contact with the upper link means.

5. The implement set forth in claim 4 wherein each of the resilient elements is a coil spring having one end anchored to the connection between its associated upper link means and carrier element and its other end operatively anchored to one of the bars.

6. An agricultural implement for use with a tractor having vertically movable and power-operated hitch means, the implement including an elongated toolbar extending transversely to the normal direction of movement of the implement, means on the toolbar for integral connection with the tractor hitch, a plurality of earth-working tool carrier rigs positioned rearwardly of the tool-bar and each being interconnected with the toolbar by a pair of upper and lower links which form a four-bar linkage with the tool-bar and their associated rigs to enable vertical movement of the rigs relative to the toolbar, the implement being characterized in that a pair of elongated lift bars are positioned directly under the upper links in parallelism to the toolbar, one lift bar is positioned under the upper links for the rigs mounted on the tool-bar to one side of its transverse centerline and the other lift bar is positioned under the upper links for the rigs mounted on the toolbar to the opposite side of its transverse centerline, a pair of arms are secured to each lift bar and pivotally connected to the toolbar to enable vertical movement of the lift bars relative to the toolbar, independently operable power means are operatively connected between the lift bars and toolbar to move the lift bars vertically about the pivotal connections between the arms and toolbar, a coil spring is anchored between each of the upper links and its associated lift bar so that, when the lift bars are lowered about the pivotal connections between the arms and toolbar, the lift bars will move away from the upper links and tension the coil springs to provide a downward bias on the rigs, and the parts being so constructed and arranged so that, upon upward movement of the lift bars, the lift bars will contact the upper links to raise the rigs independently of raising movement of the toolbar, and the rigs on one side of the transverse centerline of the toolbar can be raised independently of the rigs on the other side of the transverse centerline of the toolbar.

7. An agricultural implement including a support element adapted to be carried by a mobile frame, an earth-working tool carrier element, and a pair of upper and lower link means pivotally connected to the two elements to interconnect the two elements for ground-traversal in unison and enable vertical movement of the carrier element relative to the support element, characterized in that an adjusting element is positioned directly between the upper and lower link means and pivotally connected to the support element for vertical swinging movement, resilient means is anchored to and tensioned between the adjusting element and the upper link means, and power means is operatively connected between the support and adjusting elements to vertically move the adjusting element relative to the support element so that, upon lowering movement of the adjusting element, the resilient means provides a downward bias on the link means and carrier element.

* * * * *